United States Patent
Blythe (10) Patent No.: US 11,842,969 B2
(45) Date of Patent: Dec. 12, 2023

(54) INTEGRATED CIRCUIT, METHOD AND COMPUTER PROGRAM

(71) Applicant: MASTERCARD INTERNATIONAL INCORPORATED, Purchase, NY (US)

(72) Inventor: Simon Blythe, Ely (GB)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 419 days.

(21) Appl. No.: 16/705,568

(22) Filed: Dec. 6, 2019

(65) Prior Publication Data

US 2020/0185339 A1    Jun. 11, 2020

(30) Foreign Application Priority Data

Dec. 6, 2018 (EP) .................................. 18210773

(51) Int. Cl.
    *H01L 23/00* (2006.01)
    *G06F 21/55* (2013.01)
    (Continued)

(52) U.S. Cl.
    CPC .......... *H01L 23/576* (2013.01); *G06F 21/554* (2013.01); *G11C 7/1096* (2013.01); *H01L 23/34* (2013.01); *G06F 2221/034* (2013.01)

(58) Field of Classification Search
    CPC ..... H01L 23/576; H01L 23/34; G06F 21/554; G06F 2221/034; G11C 7/1096
    See application file for complete search history.

(56) References Cited

U.S. PATENT DOCUMENTS

| 8,522,049 B1 * | 8/2013 | Ahmadi | G06F 21/86 713/193 |
| 9,075,991 B1 * | 7/2015 | Leetham | G06F 21/566 |

(Continued)

FOREIGN PATENT DOCUMENTS

| CN | 103339635 A | 10/2013 |
| EP | 1461681 A2 | 9/2004 |

(Continued)

OTHER PUBLICATIONS

Gu et al., 'Thermal-aware 3D Design for Side-channel Information Leakage'. 2016 IEEE 34th International Conference on Computer Design. 2016, p. 520-527. (Year: 2016).*

(Continued)

*Primary Examiner* — Carl G Colin
*Assistant Examiner* — Zhe Liu
(74) *Attorney, Agent, or Firm* — Jordan IP Law, LLC (57) ABSTRACT

An integrated circuit is disclosed. The integrated circuit comprises: a processing region configured to run one instruction from a plurality of instructions; a first temperature measuring region configured to measure a first temperature within the integrated circuit in response to the processing region running the one instruction; the processing region being configured to compare the measured first temperature with a predefined temperature at the first temperature measuring region when the processing region runs the one instruction and to trigger an event when the measured first temperature exceeds the predefined temperature by a threshold value.

6 Claims, 4 Drawing Sheets

(51) Int. Cl.
*G11C 7/10* (2006.01)
*H01L 23/34* (2006.01)

(56) References Cited

U.S. PATENT DOCUMENTS

| | | | |
|---|---|---|---|
| 10,175,118 B1* | 1/2019 | Rezayee | G01K 7/16 |
| 2004/0049662 A1* | 3/2004 | Janke | G06F 1/324 |
| | | | 713/600 |
| 2007/0146056 A1* | 6/2007 | McClure | G01K 7/015 |
| | | | 257/467 |
| 2009/0300312 A1* | 12/2009 | Handschuh | G06F 21/554 |
| | | | 711/E12.001 |
| 2012/0096547 A1 | 4/2012 | Barau et al. | |
| 2016/0283751 A1* | 9/2016 | Arora | G06F 21/71 |
| 2017/0147509 A1* | 5/2017 | Nevers | G06F 12/1009 |
| 2017/0357829 A1 | 12/2017 | Park et al. | |
| 2018/0089425 A1* | 3/2018 | Trikalinou | G06F 21/70 |
| 2018/0322278 A1 | 11/2018 | Hershman et al. | |
| 2021/0004461 A1* | 1/2021 | Guilley | H01L 23/576 |
| 2021/0242512 A1* | 8/2021 | Koerner | H01M 10/486 |

FOREIGN PATENT DOCUMENTS

| | | |
|---|---|---|
| TW | I625627 B | 6/2018 |
| WO | 2003058409 A2 | 7/2003 |
| WO | 2003058409 A3 | 7/2003 |

OTHER PUBLICATIONS

Extended European Search Report for European Patent Application No. 18210773.0, dated May 20, 2019, 8 pages.

Michael Hutter et al., "The Temperature Side Channel and Heating Fault Attacks", International Association for Cryptologic Research, vol. Mar. 27, 2014: 144744, Mar. 27, 2014, pp. 1-17.

Office Action for Taiwanese Patent Application No. 108141447, dated Aug. 4, 2020, 15 pages including 6 pages of English translation.

* cited by examiner

| Instruction | 1st Temp | 2nd Temp | 3rd Temp | 4th Temp |
|---|---|---|---|---|
| Cryptogram | 55 | 85 | 45 | 40 |
| Ack. Card reader | 40 | 55 | 40 | 70 |
| .... | | | | |

FIG. 4

INTEGRATED CIRCUIT, METHOD AND COMPUTER PROGRAM

CROSS-REFERENCE TO RELATED APPLICATIONS

The present application claims priority to European Patent Application No. 18210773.0 (filed on Dec. 6, 2018), which is hereby incorporated by reference in its entirety.

BACKGROUND

Field of the Disclosure

The present invention relates to an integrated circuit, method and computer program.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Physical attacks on semiconductor chips (such as smartcard chips in credit and debit cards or Subscriber Identity Modules in mobile telephones) are known. In these types of attacks, hackers may attempt to obtain cryptographic keys or other secrets securely stored within the circuitry of the semiconductor die. These types of attacks require physical access to the die.

In these types of attacks, optical probing may take place where the die is thinned from the backside down to 10 μm (or less) remaining thickness to allow for laser probing. In other instances, complete removal of semiconductor from the backside over selected areas is carried out to allow for electrical or electron beam probing of the metal interconnects. Other mechanisms for physical attacks exist where the die is thinned to permit high-resolution X-Ray tomography or optical emission studies.

One option to reduce the likelihood of a successful physical attack is to try and protect the backside of the semiconductor die. However, there has been very little success in finding a protection mechanism that is not prohibitively expensive or too complex to introduce into an integrated circuit fabrication process.

Accordingly there is a need to reduce the likelihood of a successful physical attack on a semiconductor die that does not rely on only protecting the backside of the semiconductor die. It is an aim of the present disclosure to address this issue.

SUMMARY

According to one aspect, there is provided an integrated circuit, comprising: a processing region configured to run one instruction from a plurality of instructions; a first temperature measuring region configured to measure a first temperature within the integrated circuit in response to the processing region running the one instruction; the processing region being configured to compare the measured first temperature with a predefined temperature at the first temperature measuring region when the processing region runs the one instruction and to trigger an event when the measured first temperature exceeds the predefined temperature by a threshold value.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Referring now to the drawings, wherein like reference numerals designate identical or corresponding parts throughout the several views.

Figure 1:
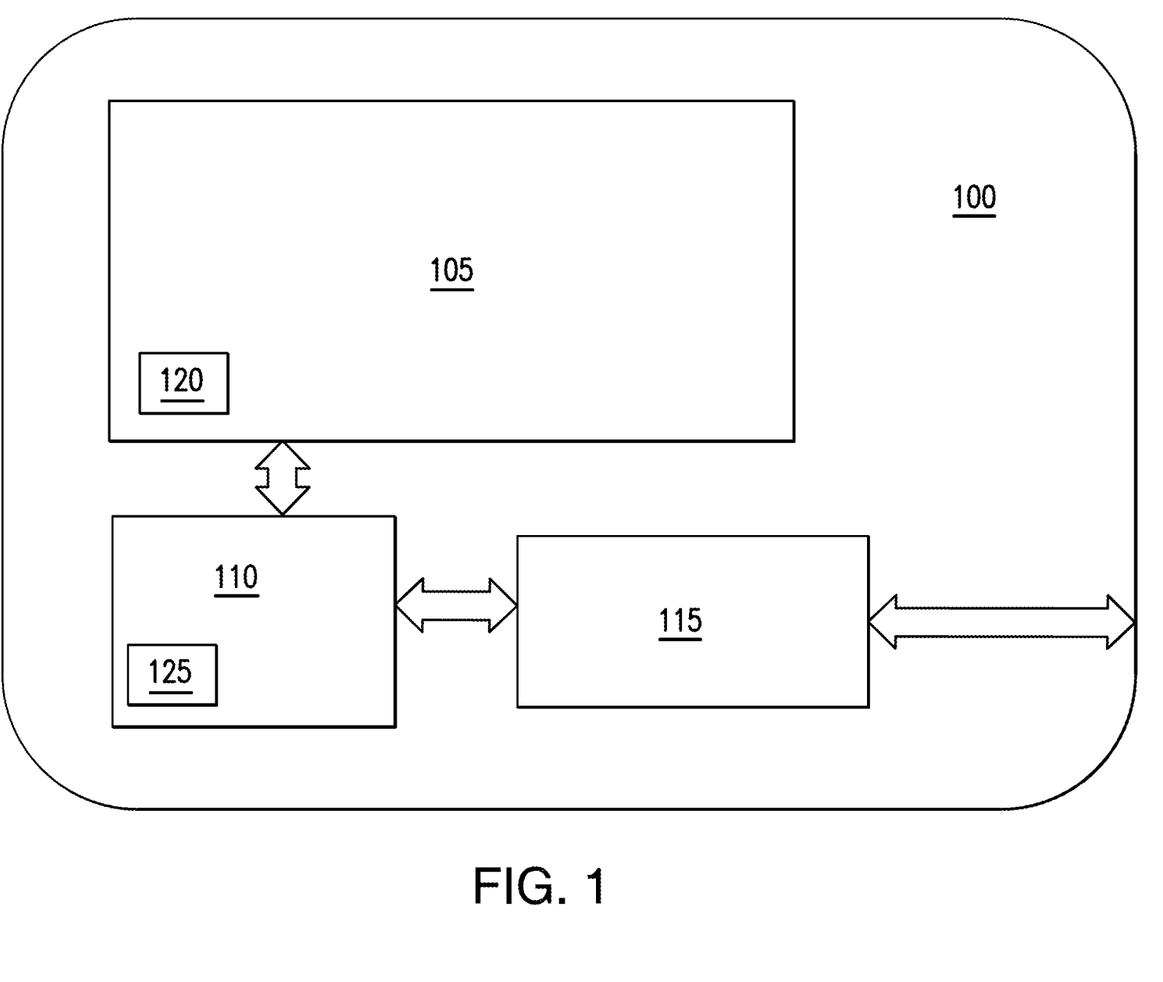
FIGS. 1 and 2 respectively describe an integrated circuit according to embodiments of the disclosure.

FIG. 1 shows an integrated circuit 100 according to embodiments of the disclosure. The integrated circuit 100 will be provided on semiconductor material such as Silicon (Si) or Gallium Arsenide (GaAs). In embodiments of the disclosure, the integrated circuit 100 will be provided on a Chip and PIN style credit or debit card which may include contactless technology. Such integrated circuit 100 may thus conform to the EMV Standard, or other Standards or be based on Standards such as ISO/IEC 7816 and ISO/IEC 14443.

Although the integrated circuit 100 will include many distinct areas, each one performing various functions to comply with these Standards, three areas are shown in FIG. 1 for the convenience of explanation. Of course, more or less than three areas is envisaged.

The integrated circuit 100 includes a processing region 110 which comprises circuitry configured to exchange and process data. Typically, the data is exchanged in Application Protocol Data Units (APDUs) and will be processed in response to an instruction. For example, an instruction will be passed to the processing region 110 and the processing region 110 will appropriately process and possibly exchange the data with another region within the integrated circuit 100. An instruction is a single operation of the processing region 110 taken from an instruction set comprising a plurality of instructions, as would be appreciated by the skilled person.

One example of an instruction in Chip and PIN technology is a command. Such a command may include a generate application cryptogram command, application block command, external authenticate command or the like. These commands are defined in various standards such as ISO/IEC 7816-3 and are thus known to the skilled person.

It will be appreciated that whilst the commands defined above are used in Chip and PIN technology, some commands such as the external authenticate command are used in other chip card applications such as GSM SIM card technology which comply with the ISO/IEC 7816-4 standard. Accordingly, the disclosure is not limited to Chip and PIN technology and may be equally applicable to any appropriate technology.

During processing of the instructions, the processing region 110 may process or exchange sensitive data. In other words, the processing region 110 may process or exchange data which, if captured by a scurrilous third party may compromise the security of the integrated circuit 100. An example of sensitive data is a cryptographic key used in the generation of a cryptogram, or may be personal information relating to the user of the integrated circuit 100. This sensitive data may be stored within a secure part of storage region 105 in an unencrypted form. For example, the cryptographic key used in generating a cryptogram is stored in an unencrypted form in a secure part of storage region 105.

In operation, to approve a transaction the processing region 110 may receive, via communication circuitry 115, a generate application cryptogram command as an instruction from a card reader (not shown) that communicates with the communication circuitry 115. In addition to the instruction, the processing region 110 will receive other data units such as the transaction amount and other information pertinent to approving the transaction from the card reader. The processing region 110 will retrieve the cryptographic key from the secure part of the storage region 105 and will generate the cryptogram by encrypting the other data units using the cryptographic key. The cryptogram is then sent to communication circuitry 115 which sends the cryptogram to the card reader.

If a scurrilous third party performs a physical attack on the integrated circuit 100, the third party can access the cryptographic key from a bus 130 connecting the processing circuitry 110 to the storage region 105 as it is retrieved from the storage region 105. In other words, the third party may send a generate application cryptogram command from a card reader. In response to this, the unencrypted cryptographic key will be retrieved from the secure part of the storage region 105 and will be intercepted by the third party using electrical or electron beam probing of exposed interconnects. Indeed, the cryptographic key may be retrieved directly from the secure part of the storage region 105 if a physical attack exposes the correct part of the storage region 105. This would compromise the security of the integrated circuit 100.

When the integrated circuit 100 is made, the semiconductor die onto which the storage region 105, the processing circuitry 110 and the communication circuitry 115 is fabricated is provided with heat dissipating material. The distribution and heat dissipating characteristics of the heat dissipating material is controlled to ensure that no part of the integrated circuit 100 overheats and either fails or becomes inoperable during operation of the integrated circuit 100.

The heat dissipating material may be located anywhere on the semiconductor die. This includes the backside of the semiconductor die. As noted above, in order to gain physical access to the integrated circuit 100, at least part of the backside of the semiconductor die is removed. This means that at least part of the heat dissipating material is removed. This alters the heat dissipating characteristics of the integrated circuit 100.

In particular, after the heat dissipating material has been removed from an area, the local temperature of the semiconductor die at that area increases significantly compared to areas where the heat dissipating material exists. This is because the heat dissipating material has better heat dissipating characteristics compared to heat dissipation into the ambient surroundings.

Accordingly, in embodiments of the present disclosure, one or more temperature sensors are added to the integrated circuit 100 to measure the temperature of at least one area of the integrated circuit 100 during operation. In the instance that the temperature at that area is greater than a threshold value, an event is triggered. In other words, if the temperature in that area is greater than the threshold value, it is assumed that the integrated circuit 100 has been subjected to a physical hack for example. Accordingly, the event may be deletion or corruption of data within the storage region 105, or parts of the storage region (such as the secure storage region), destruction of the processing region 110, issuance of dummy data by the secure storage region to obfuscate the sensitive data or the like. In other words, the event prohibits a hacker from obtaining sensitive information.

As noted above, the storage region 105 and the processing region 110 are areas where hackers attempt to gain access to the physical semiconductor die onto which the integrated circuit 100 is fabricated. In the specific, non-limiting embodiments, the secure area of the storage region 105 and the area of the processing region 110 communicating with the secure storage, are areas which physical hackers are particularly keen to access.

Accordingly, a first temperature sensor 120 is fabricated into the secure area of the storage region 105 and a second temperature sensor 125 is fabricated into the processing region 110. In other words, in embodiments, the first temperature sensor 120 and the second temperature sensor 125 are located in areas of the integrated circuit 100 that are likely to be exposed or modified during a physical attack. Of course, the disclosure is not so limited and the sensors may be located anywhere on the integrated circuit 100 such as in less targeted areas to provide a background temperature reading. These temperature sensors are fabricated using known techniques and may include re-purposing already fabricated transistors in these areas. The fabrication of temperature sensors onto semiconductor dies and into integrated circuits is known and so, for brevity, will not be explained in detail hereinafter.

In the event of a physical hack, due to the removal of the heat dissipating material on the semiconductor die, the temperature measured by both the first temperature sensor 120 and the second temperature sensor 125 will exceed the temperatures expected at these areas had the heat dissipating material not been removed. In particular, in the presence of heat dissipating material, the temperature measured by the first temperature sensor 120 and/or the second temperature sensor 125, for a given instruction run by the processing region 110, and for a given ambient temperature, will be well defined. In other words, in the presence of heat dissipating material, the increase in the temperature in the processing region 110 and/or the secure area of storage region 105 will be well defined when a particular instruction is run by the processing region 110.

However, where the heat dissipating material has been removed, damaged or compromised in any way during a physical attack, the temperature measured by the first temperature sensor 120 and/or the second temperature sensor 125 for the given instruction will be very different to that anticipated.

Accordingly, in embodiments of the disclosure, a physical attack is identified when the temperature measured by the first temperature sensor 120 and/or the second temperature sensor 125 for a given instruction is higher than anticipated by a predetermined amount.

Figure 2:
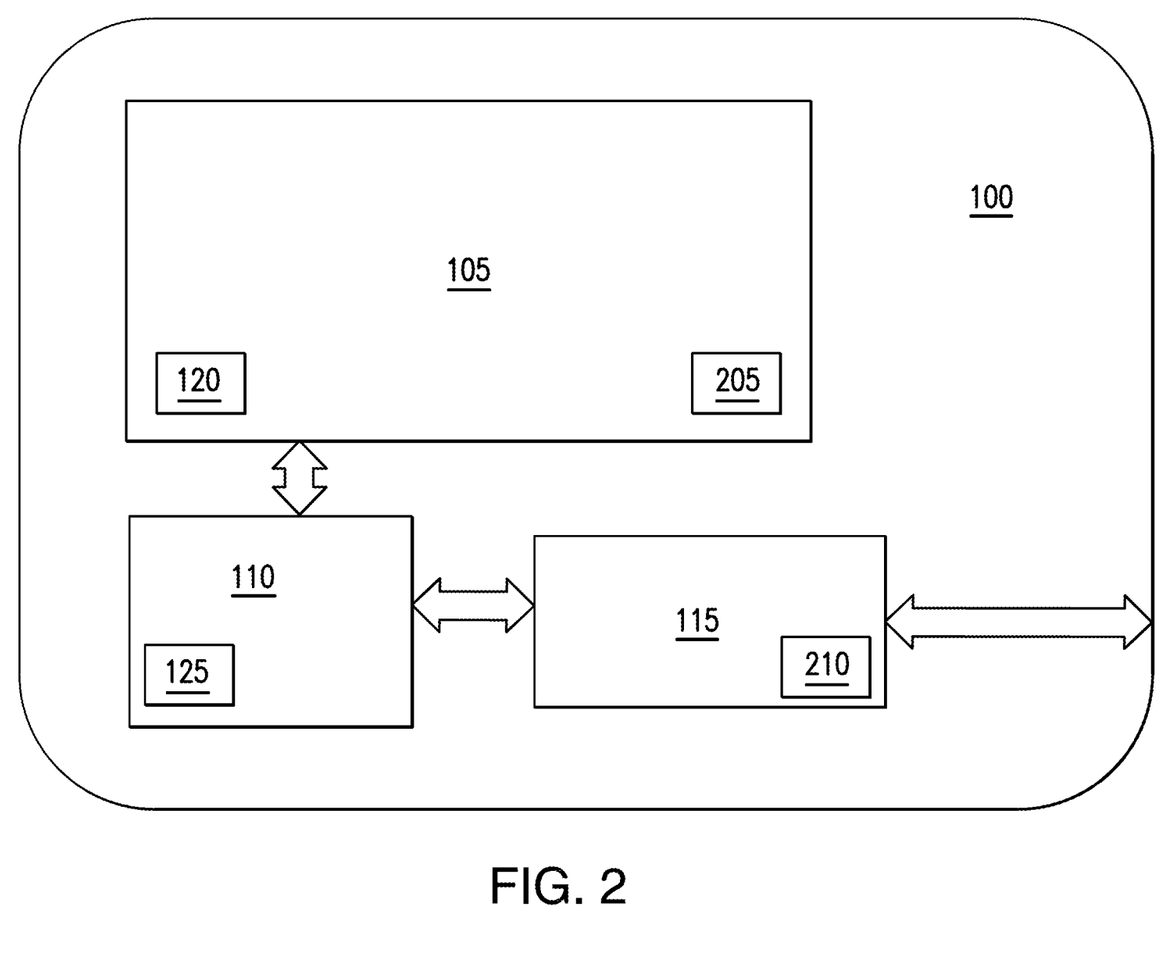

FIG. 2 shows an integrated circuit 100 according to embodiments. In the integrated circuit 100 of FIG. 2, many components described with reference to FIG. 1 are shown. These common components are provided with common reference numerals and the reader is referred to the discussion of FIG. 1. In addition, however, a third temperature sensor 210 is provided in the communication circuitry 115 and a fourth temperature sensor 205 is provided in the non-secure part of the storage region 105.

Normally, during a physical attack, the heat dissipating material around the communication circuitry 115 remains unaffected. This means that the third temperature sensor 210 is provided to measure the ambient or background temperature of the integrated circuit 100. Of course, the disclosure is not so limited and a third temperature sensor 210 may be provided anywhere within the integrated circuit 100 where a physical attack is unlikely to occur in order to measure the ambient temperature of the integrated circuit 100.

As noted above, the fourth temperature sensor 205 is provided in the non-secure part of the storage region 105. In a similar manner to the communication circuitry 115, as the non-secure part of the storage region is unlikely to be hacked, the heat dissipating material around the non-secure part of the storage region 105 normally remains intact. Therefore, the fourth temperature sensor 205 may also be used to measure the ambient temperature of the integrated circuit 100.

It should be noted that the provision of one or more ambient temperature sensors is optional.

Figure 3:
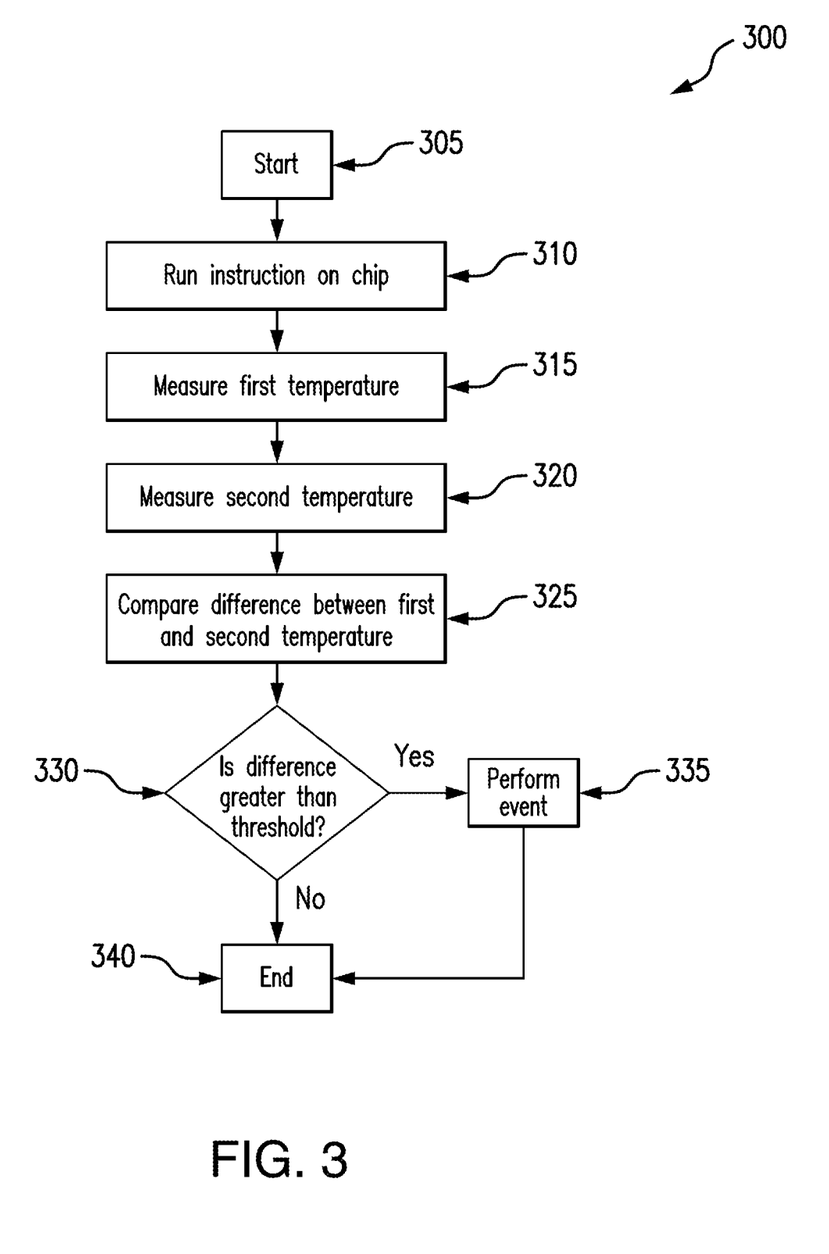
FIG. 3 describes a flow chart according to embodiments of the disclosure.

Referring to FIG. 3, a flow chart 300 describing embodiments of the disclosure is shown. The flow chart 300 will run on the integrated circuit 100 in embodiments using software stored in the storage region 105.

The flow chart 300 starts at step 305. The process moves to step 310 where an instruction is run by the processing region 110. An example of an instruction is an application cryptogram command received via a card reader communicating with the communication circuitry 115. As the instruction is being run by the processing region 110, the processing region 110 polls the first temperature sensor 120 and receives the temperature measured by the first temperature sensor 120. This is step 315. The process moves to step 320 where the processing region 110 polls the second temperature sensor 125 and receives the temperature measured by the second temperature sensor 125. Of course, it is envisaged that the processing region 110 may poll the third temperature sensor 205 and/or the fourth temperature sensor 210 in addition to or instead of the first temperature sensor 120 and the second temperature sensor 125. In other words, it is envisaged that a first temperature reading is provided from an area likely to be compromised and a second temperature reading is provided from another area likely to be compromised or from an area unlikely to be compromised during a physical attack.

The processing region 110 then compares the difference between the first and second temperature. This is step 325. The process then moves to step 330 where a check is conducted to establish whether the difference between the first and second temperature exceeds a threshold temperature. This will be described in more detail in FIG. 4. In the event that the difference does exceed the threshold temperature, the "yes" path is followed to step 335 where a physical attack is detected and an event such as a deletion of at least the secure region of the storage region 105 as explained above is performed. The process then moves to step 340 where the flow chart ends.

Returning to step 330, in the event that the temperature difference does not exceed the threshold temperature, the "no" path is followed to step 340 where the flow chart ends.

The flow chart 300 describes that a physical attack is detected when the temperature difference between two measured temperatures exceeds a threshold temperature when a particular instruction is run. One of the measured temperatures may be an ambient temperature or both temperatures may be measured in specific areas or regions likely to be subject to a physical attack within the integrated circuit 100 when the instruction is run.

In some instances, a physical attack may be detected when the temperature difference between three or more measured temperatures exceeds a threshold when a particular instruction is run.

It should be noted that the disclosure is not so limited to a plurality of measured temperatures. For example, the physical attack may be detected when one measured temperature in an area likely to be subject to physical attack exceeds a particular temperature by a predetermined amount when an instruction is run by the processing region 110. In other words, a physical attack may be detected when the absolute measured temperature exceeds a particular temperature when a specific instruction is run by the processing region 110.

Figure 4:
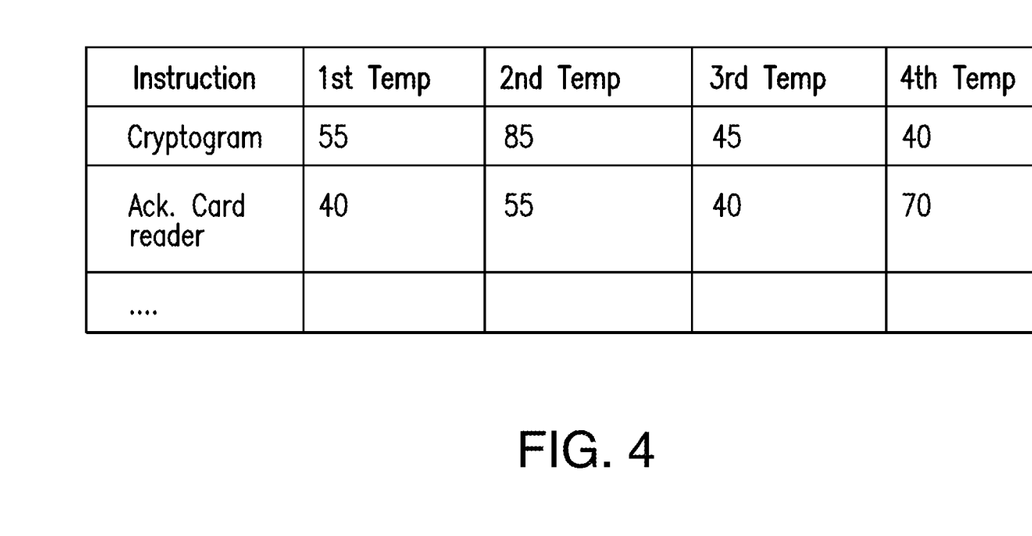
FIG. 4 describes a table storing temperatures used in the embodiments of FIG. 3.

Referring to FIG. 4, a table is shown. This table is, in embodiments, stored in the storage region 105. The table may be stored in the secure part of the storage region 105 to ensure the integrity of the table. The table may be any data structure that associates an instruction run by the processing region 110 with an expected temperature at the first temperature sensor 120, the second temperature sensor 125, the third temperature sensor 205 and the fourth temperature sensor 210. In other words, the table stores the temperature that is anticipated at the respective temperature sensors when the processing region 110 runs a particular instruction and the heat dissipating material is intact. This temperature may be the absolute temperature at the respective temperature sensors for a given ambient temperature.

As noted above, in embodiments, the difference between two measured temperatures is used to determine whether a physical attack has taken place. This is particularly useful as the effect of ambient temperature is mitigated by considering the difference in temperature. In other words, in the case of the absolute temperature being used, in some instances where high ambient temperatures occur, the absolute temperature may exceed the threshold value even though no physical attack has taken place. However, where the difference between two measured temperatures is used to detect a physical attack, the effect of a large ambient temperature is mitigated. This reduces the likelihood of detecting a false positive physical attack.

In the example table of FIG. 4, where the heat dissipating material is intact and the instruction run by the processing region 110 is an application cryptogram command, the first temperature measured by the first temperature sensor 120 is 55° C., the second temperature measured by the second temperature sensor 125 is 85° C., the third temperature measured by the third temperature sensor 205 is 45° C. and the fourth temperature measured by the fourth temperature sensor 210 is 40° C. This temperature distribution is indicative of the command being run by the processing region 110. In other words, when the application cryptogram command is run, the processing region 110 will retrieve the cryptogram from the secure part of storage region 105. As this is a complex command, this requires the processing region 110 to operate intensively meaning that the second temperature (the temperature associated with the processing region 110) will be high. In addition, the secure part of the storage region 105 operates and so the first temperature (the temperature associated with the storage region 105) increases.

As the communication circuitry 115 and the non-secure part of the storage region 105 do not operate intensively, the third temperature and the fourth temperature are around ambient temperature.

In the example table of FIG. 4, where the heat dissipating material is intact and the instruction run by the processing region 110 is an acknowledge card reader command, the first temperature measured by the first temperature sensor 120 is 40° C., the second temperature measured by the second temperature sensor 125 is 55° C., the third temperature measured by the third temperature sensor 205 is 40° C. and the fourth temperature measured by the fourth temperature sensor 210 is 70° C. Again, this temperature distribution is indicative of the instruction being run by the processing region 110. Specifically, the acknowledge card reader command does not require access to the secure part of the storage region 105. Therefore, the first temperature measured by the first temperature sensor 120 is approximately ambient temperature. For this instruction, the processing region 110 does not need to operate intensively as the instruction is not complex. This means that the second temperature (the temperature of the processing region 110) is quite low compared to the temperature when processing a complex instruction. Further, as the non-secure part of storage region 105 does not operate during the acknowledge card reader command, the temperature associated with the non-secure part of the storage region 105 is low. Finally, as the communication circuitry 115 must communicate with the card reader for processing this instruction, the temperature of the communication circuitry 115 increases as measured by the fourth temperature sensor 210.

Accordingly, the table of FIG. 4 includes the predefined temperature associated with each temperature sensor when a particular instruction is run on the processing region 110 and the integrated circuit 100 has intact heat dissipating material. The difference between any two of these stored temperatures will be a predefined temperature difference.

Therefore, referring back to step 330 in FIG. 3, the temperature difference between two measured temperatures is determined for the integrated circuit 100 in which the processing region 110 is running a particular instruction. This is compared with the predefined temperature difference between the two measured temperatures stored in the table of FIG. 4 for the same instruction. In the event that the difference between the two measured temperatures is above a threshold of, for example, 10% of the predefined temperature difference, then the process moves to step 335. Alternatively, if the measured difference is at or below that threshold, the process moves to step 340 as already explained with reference to FIG. 3. Of course, although the above describes the difference between the two measured temperatures is above a threshold of, for example, 10% of the predefined temperature difference, the disclosure is not so limited. The difference may be a different percentage or may be an absolute value as would be appreciated.

As explained above, in embodiments of the disclosure, the temperature of various parts of the integrated circuit 100 when processing an instruction is characteristic of the integrated circuit 100. This means that although the above has been described with reference to identifying whether heat dissipating material has been removed from the semiconductor die, the disclosure is not so limited. For example, in some instances it is desirable to ensure that instructions are only run on certain (i.e. legitimate) integrated circuits. In order to avoid individuals from running the instructions on other integrated circuits, a system similar to that explained above may be employed. In other words, it is possible to measure the temperature at one or more parts of the integrated circuit when processing an instruction and comparing this to a predetermined temperature when the same instruction is run on a legitimate integrated circuit, and triggering an event when the measured temperature is above a threshold difference. This may be useful where manufacturers may wish software to only run on specific, approved, integrated circuits.

Therefore, the above technique may be used to identify when such software is run on non-approved integrated circuits as the measured temperature within the integrated circuit when running an instruction may differ from the temperature within the approved integrated circuit when running the instruction.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. An integrated circuit capable of detecting a physical attack, comprising:
  a processing region configured to run at least one instruction from a plurality of instructions;
  a first temperature measuring region located in a secure area and configured to measure a first temperature within the integrated circuit in response to the processing region running the at least one instruction;
  a second temperature measuring region located in a non-secure area and configured to measure a second temperature within the integrated circuit to determine an ambient temperature of the integrated circuit;

the processing region being configured to calculate a temperature difference between the measured first temperature and the second temperature when the processing region runs a particular instruction and compare the calculated temperature difference against a predefined temperature difference;

wherein the predefined temperature difference is a temperature difference between a stored first temperature of the first temperature measuring region located in a secure area, and a stored second temperature of the temperature measuring region located in a non-secure area when the processor region runs the particular instruction and when the heat dissipating material of the integrated circuit is intact and to trigger an event when the comparison between the calculated temperature difference and the predefined temperature difference exceeds a threshold value; and wherein the event is to detect a physical attack on the integrated circuit.

2. An integrated circuit according to claim 1, comprising the storage region including the secure region and the non-secure region, wherein in the event of the physical attack being detected, the processing region is configured to delete data from the secure region.

3. A method for detecting a physical attack on an integrated circuit, the method comprising:

running at least one instruction from a plurality of instructions;

measuring a first temperature at a first temperature measuring region located in a secure area within the integrated circuit in response to the running of the at least one instruction;

measuring a second temperature at a second temperature measuring region located in a non-secure area within the integrated circuit in response to the running of the at least one instruction;

calculating a temperature difference between the measured first temperature and the measured second temperature when a particular instruction is run and comparing the calculated temperature difference against a predefined temperature difference, wherein the predefined temperature difference is a temperature difference between a stored first temperature of the first temperature measuring region located in a secure area, and a stored second temperature of the temperature measuring region located in a non-secure area when the processor region runs the particular instruction and when the heat dissipating material of the integrated circuit is intact;

triggering an event when the comparison between the calculated temperature difference and the predefined temperature difference exceeds a threshold value; and wherein the event is to detect a physical attack on the integrated circuit.

4. A method according to claim 3, wherein in the event of the physical attack being detected, the method comprises deleting data from a secure region of memory within the integrated circuit.

5. A non-transitory computer program comprising computer readable instructions which, when loaded onto a computer, configures the computer to:

run at least one instruction from a plurality of instructions;

measure a first temperature at a first temperature measuring region located in a secure area within an integrated circuit in response to the running of the at least one instruction;

measure a second temperature at a second temperature measuring region located in a non-secure area within the integrated circuit in response to the running of the at least one instruction;

calculate a temperature difference between the measured first temperature and the measured second temperature when at least one particular instruction is run and compare the calculated temperature difference against a predefined temperature difference, wherein the predefined temperature difference is a temperature difference between a stored first temperature of the first temperature measuring region located in a secure area, and a stored second temperature of the temperature measuring region located in a non-secure area when the processor region runs the particular instruction and when the heat dissipating material of the integrated circuit is intact;

trigger an event when the comparison between the calculated temperature difference and the predefined temperature difference exceeds a threshold value; and wherein the event is to detect a physical attack on the integrated circuit.

6. The non-transitory computer program according to claim 5, wherein in the event of the physical attack being detected, the computer readable instructions, when loaded onto the computer, configure the computer to delete data from a secure region of memory within the integrated circuit.

* * * * *